(No Model.) 5 Sheets—Sheet 1.

B. F. ORTON.
REGULATOR FOR DYNAMO ELECTRIC MACHINES.

No. 331,816. Patented Dec. 8, 1885.

Witnesses:
Ernest Alshagen
Chas. Toomey

Inventor:
B. F. Orton,
By his Attorney:
H. C. Townsend (No Model.) 5 Sheets—Sheet 2.

B. F. ORTON.
REGULATOR FOR DYNAMO ELECTRIC MACHINES.

No. 331,816. Patented Dec. 8, 1885.

Witnesses:
Ernest Alshagen
Thos. Tooney

Inventor:
Benjamin F. Orton
By his Attorney:

(No Model.)  5 Sheets—Sheet 3.
B. F. ORTON.
REGULATOR FOR DYNAMO ELECTRIC MACHINES.
No. 331,816.  Patented Dec. 8, 1885.
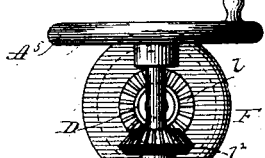
Fig. 5,
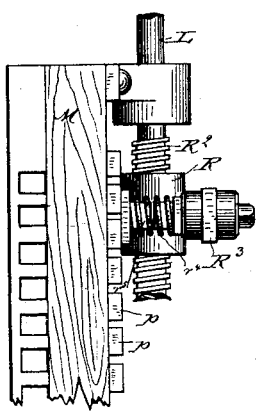
Fig. 6,
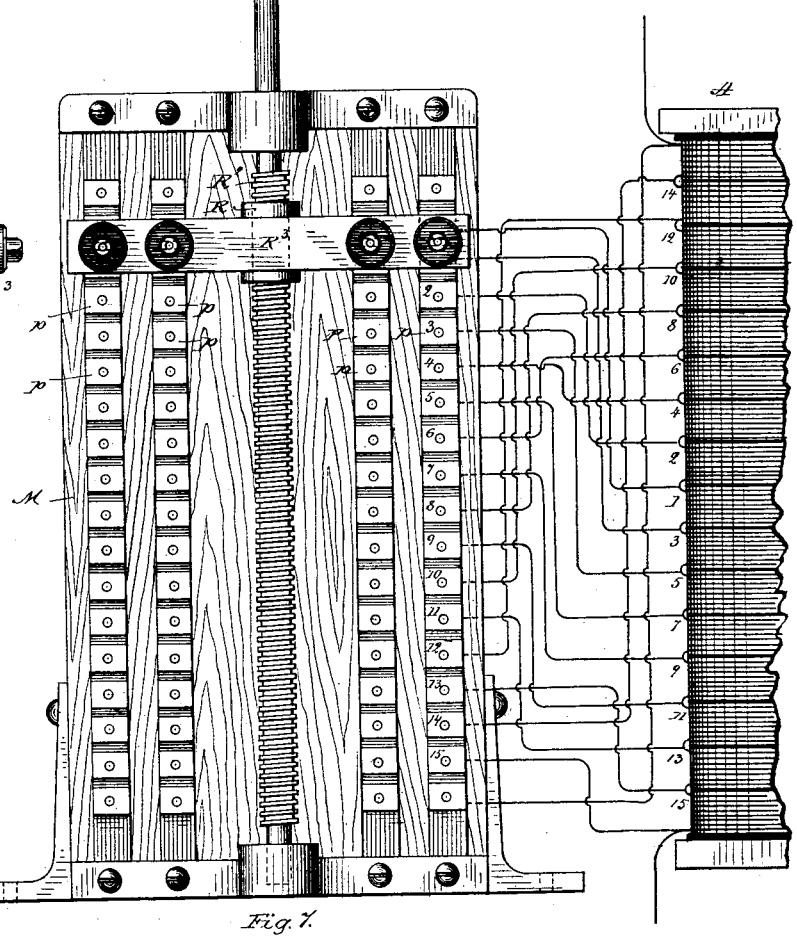
Fig. 7.
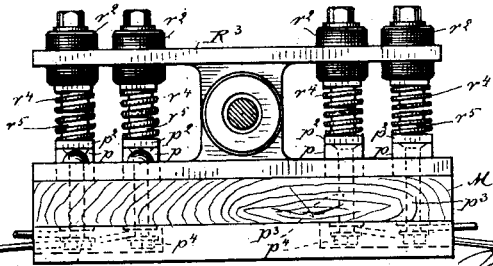
Witnesses:
Ernest Abshagen
Chs. Toomey
Inventor:
B. F. Orton
By his Attorney, H. C. Townsend (No Model.)
B. F. ORTON.
REGULATOR FOR DYNAMO ELECTRIC MACHINES.
No. 331,816. Patented Dec. 8, 1885.
5 Sheets—Sheet 4.
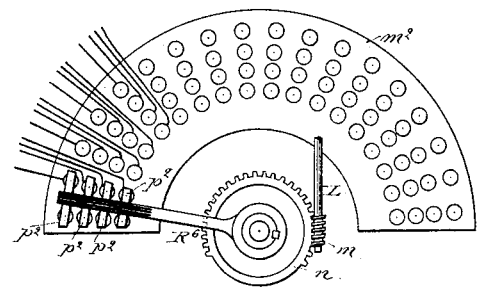
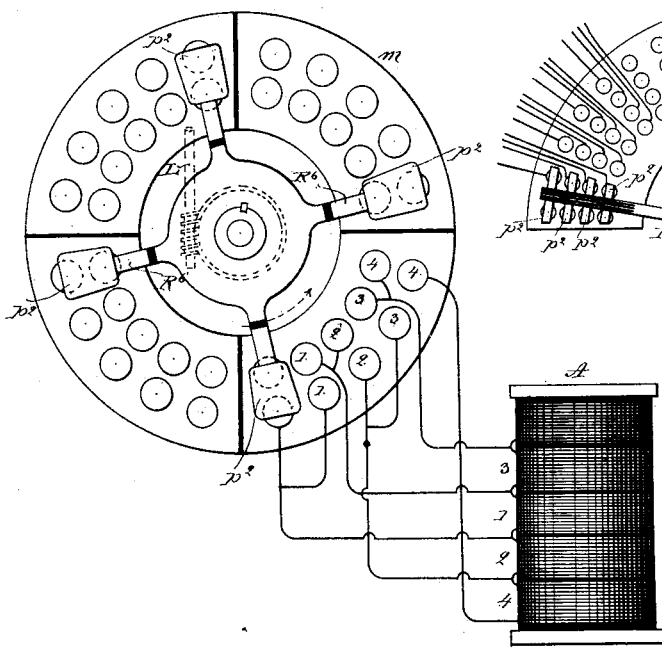
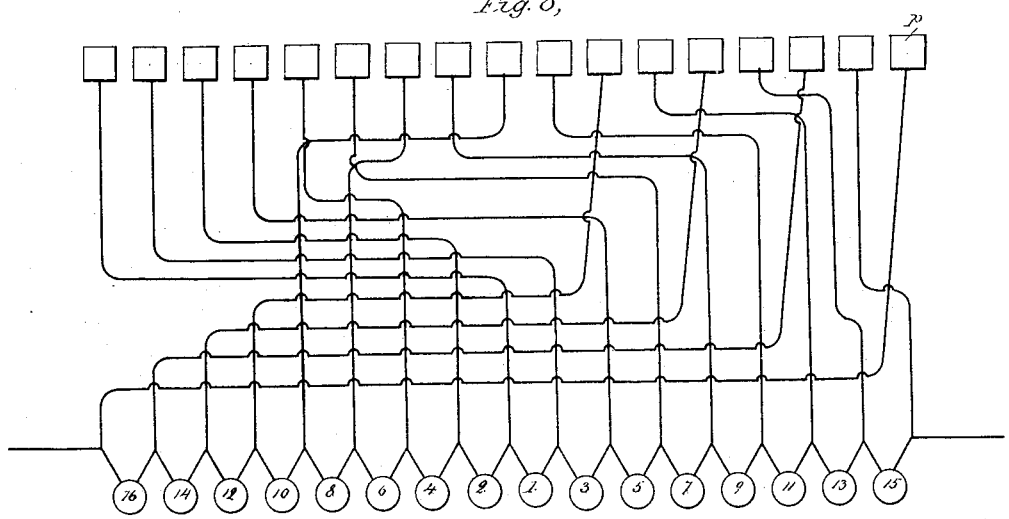
Witnesses:
Ernest Abshagen
Chs. Torney
Inventor:
Benjamin F. Orton
By his Attorney: H. C. Townsend (No Model.)  5 Sheets—Sheet 5.

B. F. ORTON.
REGULATOR FOR DYNAMO ELECTRIC MACHINES.

No. 331,816. Patented Dec. 8, 1885.

Witnesses:
Ernest Abshagen
Chas. Torrey

Inventor:
Benjamin F. Orton
By his Attorney:

UNITED STATES PATENT OFFICE.

BENJAMIN F. ORTON, OF EAST SAGINAW, MICHIGAN.

REGULATOR FOR DYNAMO-ELECTRIC MACHINES.

SPECIFICATION forming part of Letters Patent No. 331,816, dated December 8, 1885.

Application filed February 4, 1885. Serial No. 154,896. (No model.)

*To all whom it may concern:*

Be it known that I, BENJAMIN F. ORTON, a citizen of the United States, and a resident of East Saginaw, in the county of Saginaw and State of Michigan, have invented certain new and useful Improvements in Regulators for Dynamo-Electric Machines, of which the following is a specification.

My invention relates to means for automatically regulating the strength of the current that shall be developed in a dynamo-electric machine, and is designed to operate by varying the strength of the magnetic field in which the armature moves. The means which I prefer to employ for changing the strength of the magnetic field consists of a switch and proper connections to the field-magnet coils whereby a greater or less number of sections of the field-coil may be shunted, according to the strength of field required. For controlling the action of such switch, I have devised a simple and effective mechanism worked from the armature-shaft and governed in its action by an electro-magnet or other device responsive to changes in the electric current. These controlling devices are applicable to any means of varying or governing the strength of the generator—as, for instance, to means for shunting current from the field-magnet coils or for adjusting the set of the commutator, or to any other desired means.

My invention consists in the novel combination of apparatus and features of improvement that will be described in connection with the accompanying drawings and will be more specifically stated in the claims.

Figure 1:
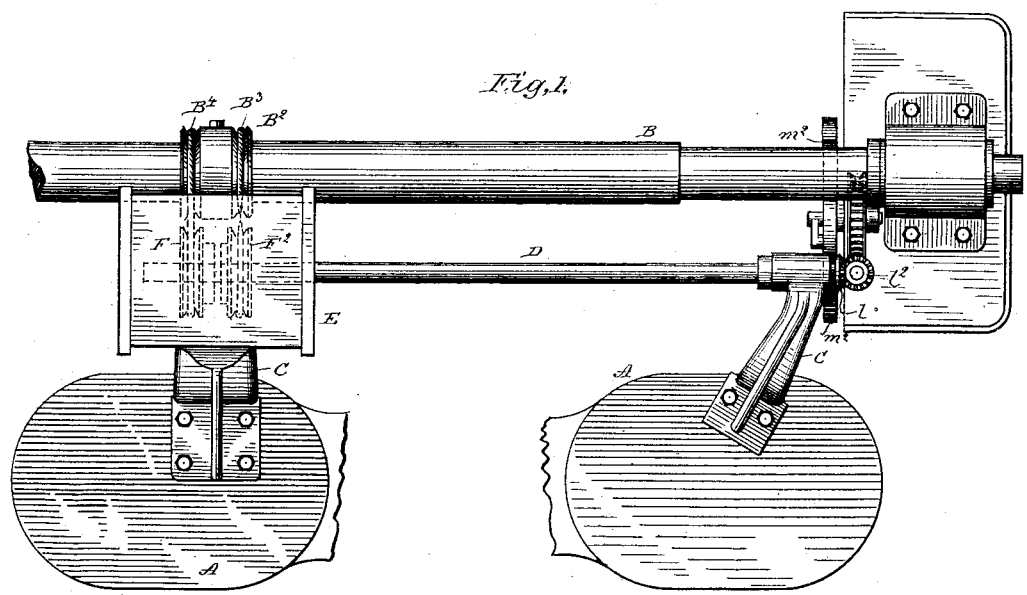
Figure 2:
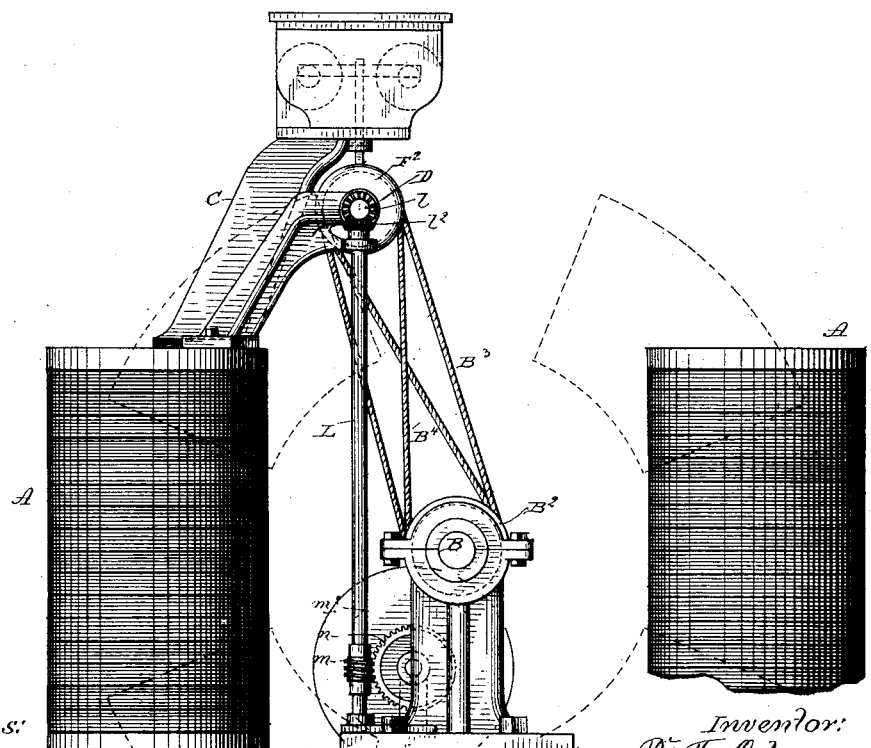
Figure 3:
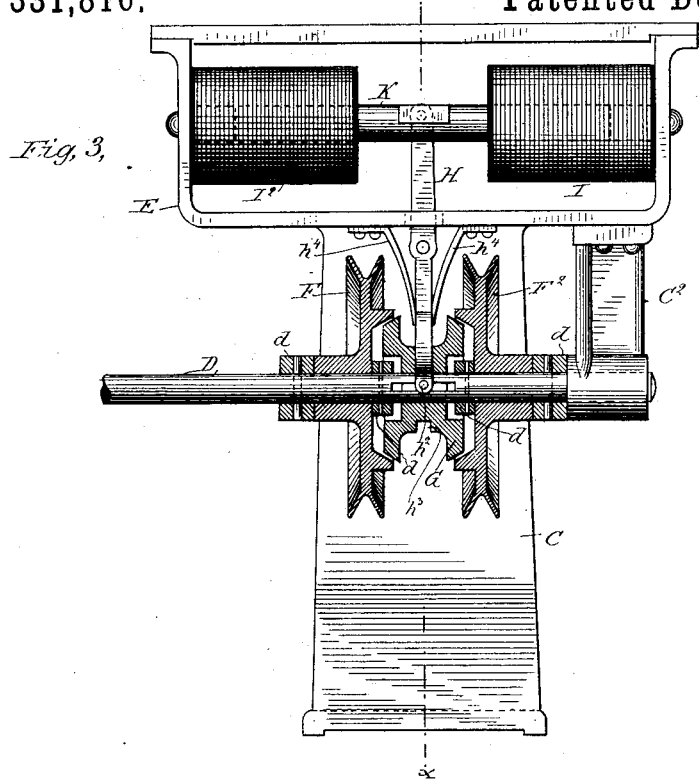
Figure 4:
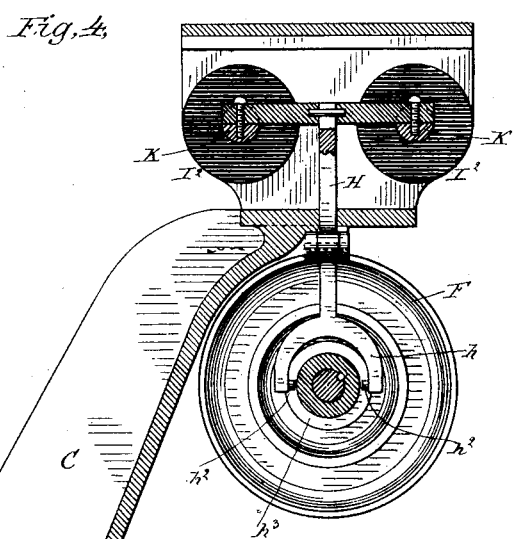
Figure 11:
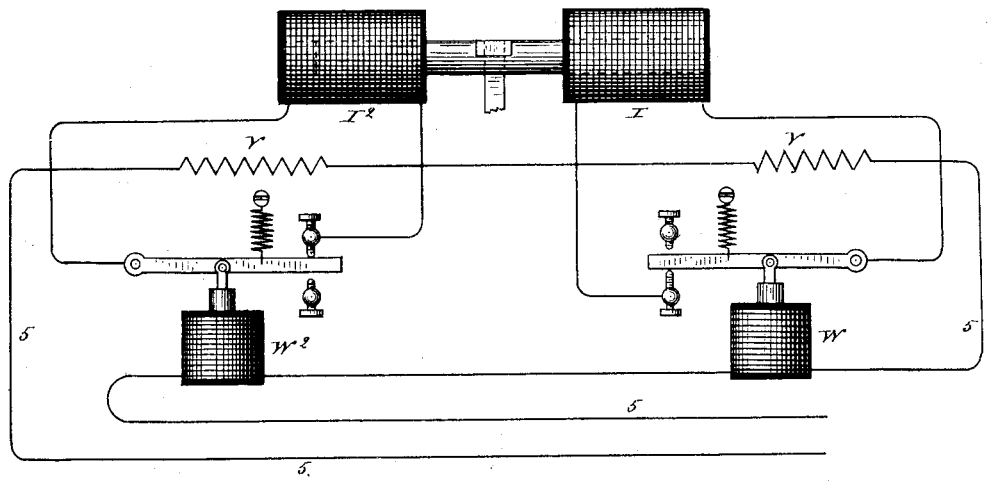
Figure 12:
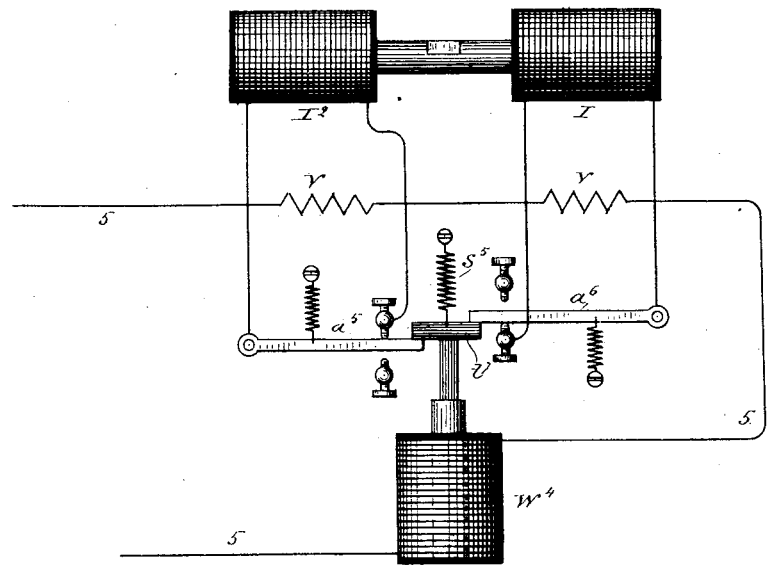

In the drawings, Figure 1 is a plan of the mechanism whereby movement may be communicated from the armature-shaft to the adjusting-switch for varying the strength of the magnetic field. Fig. 2 is an elevation of the same, looking in a line parallel with the armature-shaft. Fig. 3 is an elevation of the electro-magnet and the reversing mechanism actuated thereby. Fig. 4 is a cross-section on the line $xx$ of Fig. 3. Fig. 5 is an elevation of the approved form of controlling-switch. Fig. 6 is an edge view of a portion of the same. Fig. 7 is a top view of the switch. Fig. 8 is a diagram illustrating the manner of connecting the field-magnet coils to the switch points or studs. Fig. 9 illustrates a modification in the form of the switch. Fig. 10 shows another way of connecting the coils to the switch. Fig. 11 is a diagram showing the manner of controlling the action of the reversing-magnet shown in Figs. 1, 2, 3, and 4. Fig. 12 shows another arrangement for effecting the same result.

A A, Figs. 1 and 2, indicate field-magnets of any dynamo-electric machine, and B the armature-shaft of said machine, or a shaft rotating with said armature-shaft.

Keyed or otherwise secured to the shaft B is the double pulley or wheel $B^2$, from which, through belts $B^3$ $B^4$, motion is communicated to a counter-shaft, D, in one direction or the other, according to the set of the reversing mechanism.

At C C are indicated standards or brackets mounted in any suitable manner, preferably upon the field-magnets. One of said standards is formed at its top or provided with a yoke-shaped piece of iron, E, from which depends a bracket, $C^2$, Fig. 3, carrying the journal-box for one end of the counter-shaft D. The other end of the shaft turns in a journal upon the other bracket C, as more clearly shown in Fig. 1.

F $F^2$ indicate two loose pulleys or wheels that rotate freely in the counter-shaft, and over which the belts $B^3$ $B^4$ pass. One of said belts, $B^4$, is crossed, so that the wheels F $F^2$ revolve constantly in opposite directions while the shaft B is turning. Collars $d\ d\ d\ d$, secured to the shaft, keep the wheels in place.

Mounted on the counter-shaft, between the wheels F $F^2$, as shown more clearly in Fig. 3, is the double friction disk or wheel G, engaged with the counter-shaft by a spline or pin, or otherwise, so as to rotate the shaft, but at the same time to be capable of longitudinal movement upon the shaft into engagement with one or the other of the wheels F $F^2$. The faces of the disk G are provided with beveled friction-surfaces, as shown, adapted to engage with corresponding beveled surfaces on the face of the wheels F $F^2$. When so engaged, the disk is rotated by the wheel F or $F^2$, and the shaft D is thereby turned in one direction or the other, according to which wheel is engaged. When the disk G is in an intermediate position out of contact with both wheels F F², the counter-shaft is at rest. The reversal is effected by means of the lever H, which is thrown in one direction or the other by an electro magnet or magnets, to be presently described. The lever H is forked at its lower end, as indicated at $h$ in Fig. 4, and each arm or fork is provided with a pin, $h^2$, engaging with a circumferential groove, $h^3$, in the friction-disk G, so as to permit the lever to move the disk longitudinally into and out of engagement with the wheels F F², and yet allow the disk to rotate freely when engaged with a wheel. Centering-springs $h^4$ press against opposite sides of the lever, and tend to normally hold the disk G out of engagement with both wheels. The lever H is operated by electro-magnets I I². These consist each of two coils or solenoids corresponding to the coils of an ordinary horseshoe electro-magnet. Each solenoid has a movable core connected to the lever, two cores being connected to the lever on each side thereof. The magnets I I² are mounted upon the yoke E, as shown, and a portion of the cores of each is fixed and bolted or otherwise secured to the yoke, so as to be in magnetic connection with the yoke. The line between the movable and the fixed portions of the magnet-cores is indicated by the dotted line transverse to the magnet-axes. The movable portion of the cores acts as the core of a solenoid, while in addition there is the positive attraction of the fixed portion of each core upon the same. The fixed portions of the cores at each side of the lever are magnetically connected through the material of the yoke-piece E, the portion of the latter between said cores supplying the place of the ordinary yoke-piece for a horseshoe electro-magnet.

The devices for controlling the action of the electro-magnets I I² will be described further on. The counter-shaft D communicates movement to the upright shaft L through a bevel-gearing (indicated at $l$ $l^2$) or otherwise, and the latter communicates movement to the switching appliances, which may be operated directly by a nut working on a screw formed on or attached to the shaft L, as hereinafter described, so as to receive a rectilinear movement, or may have a circular movement in the arc of a circle. In the latter case the shaft L carries a worm, $m$, which gears with a worm-wheel, $n$, and the shaft of the latter carries an arm which works over switch-contacts or upon other devices carried by a disk or plate, $m^2$.

The preferred construction of the switching appliances is shown in Figs. 5, 6, and 7.

M indicates an upright plate of wood or other insulating material carrying suitable bearing blocks or pieces for the upright shaft L, and having secured upon its face one or more series of contact blocks, studs, or pieces, $p$, over which ride contact or circuit-closing plates $p^2$, Fig. 7. As many series of studs $p$ are provided as there are field-magnets to be operated upon. In the present instance four are shown, on the supposition that there are four field-magnets whose coils are to be simultaneously short-circuited, one section at a time. The studs $p$ are countersunk on the face of the block M, and are secured by bolts $p^3$ passing through the block M, and furnished at their rear ends with nuts $p^4$ $p^4$, which serve to tighten the bolts, and also as a means of connecting the electric conductors leading from the field-magnet coils, said conductors being clamped between the nut and a washer, and being thus put in electrical connection with the blocks or studs $p$ on the face of the plate. The heads of the bolts are countersunk in the face of the blocks $p$, so as to permit the circuit-closing pieces $p^2$ to move freely over the plates $p$. Movement is given to the pieces $p^2$ by means of the screw R², formed upon the shaft L, and the nut R, engaging with said screw. The nut R carries the cross bar R³, on which are mounted the insulating-bushings $r^2$ $r^2$ $r^2$ $r^2$. Through the latter pass bolts surrounded at their lower ends, beneath the cross-piece R³, with the stiff spiral springs $r^4$. Within the lower end of the latter are the short pins or rods $r^5$, formed at their bottom into the heads which constitute the circuit-closing contacts $p^2$. The springs $r^4$ serve to press the contact-pieces $p^2$ into firm electrical contact with the studs $p$, while the bushings $r^2$ insulate the studs of each series from those of the others. A wheel, A⁵, to be operated by hand, is secured to the shaft L, so that the latter can be readily operated in case the automatic devices fail to act.

In Fig. 5 a single field-magnet is indicated, with its coils divided into sixteen sections, connected to one of the series of contacts. In the arrangement shown the design is that the switch shall short-circuit the sections, one after the other, as it moves from one extreme to the other, beginning with the central section and following with sections alternately at each side of the center. In other words, the sections are to be short-circuited in the order of their numbering in the figure. It is not necessary to follow this order, but I deem it preferable. The coils are connected, as clearly shown in Figs. 5 and 8, the two terminals of coil 1 to the two blocks marked 1, the terminal of coil 2 farthest from the center of the magnet to block 2, the terminal of coil 3 farthest from the center to block 3, and so on in the order indicated. The connections are taken, as indicated, from the loops between the successive sections, and normally all sections are in direct circuit with one another in the usual way. The plates $p^2$ are made so wide that each shall always rest upon two adjoining studs, $p$ $p$. For instance, if it be resting on studs 1 and 2 and then be moved downward it will complete the connection between 2 and 3 before breaking the connection between 2 and 1. When studs 1 1 are bridged, coil-section 1 is short-circuited. When studs 1 and 2 are bridged, coil-sections 1 and 2 are short-circuited. When studs 2 and 3 are bridged, coil-sections 1, 2, and 3 are short-circuited, and so on in the order of the numbering of the coils, an additional coil being short-circuited at each step. The reverse action or a gradual diminution of the number of coils shunted obviously takes place on a reverse movement of the switch.

Instead of arranging the studs $p$ in straight rows, they may be arranged in circular lines, as shown in Fig. 9, and the shunting-contacts $p^2$ may be carried on the end of an arm, $R^6$, which is secured to the shaft of a worm-wheel, $n$, operated by a worm, $m$, on shaft L. The shunting-contacts are insulated from one another in any suitable manner. The same result may be secured by the employment of two parallel rows of contact-studs for each field-magnet coil, as illustrated in Fig. 10, where four sets of studs arranged in pairs are placed upon the four quadrants of a supporting disk or plate. Four arms, $R^6$, instead of one, as in Fig. 9, are employed, and each carries a switch-contact or circuit-closer, $p^2$, adapted to short-circuit the pairs of studs in the four quadrants. Each set of studs serves for a field-magnet whose coils are connected after the manner shown with reference to the single magnet A, having five coil-sections. The arms $R^6$ are made to move in the direction of the arrow, and normally are in the position illustrated. In this condition all the coils of the field-magnet are active. The studs marked 1 are connected to the two terminals of coil 1. The studs marked 2 2 are connected one to the upper terminal of 1 and the other to the lower terminal of coil 2. The studs marked 3 are connected one to the lower terminal of coil 2 and the other to the upper terminal of coil 3. The studs marked 4 4 are connected one to the upper terminal of coil 3 and the other to the lower terminal of coil 4. As will be evident, the effect of moving the arm $R^6$ and plate $p^2$ over the contacts is to first short-circuit coil 1, then to short-circuit successively and in addition coils 2, 3, and 4. The plates $p^2$ are made sufficiently broad to preserve contact at all times with one or another of the pairs of studs, so that there shall be no interruption of short-circuiting in passing from one pair of studs to another.

The preferred manner of controlling the action of the switch so as to cause a diminution or an increase in the strength of the field-magnet with an increase or diminution in the strength of the current is shown in Fig. 11, where the magnets I $I^2$, which operate the reversing mechanism and cause the requisite movements of the switch are shown connected in circuit. In the diagram, $I^2$ is to be understood as the magnet which operates upon the clutch-disk G of the reversing mechanism so as to cause the switch to move in a direction to shunt sections of the field-magnet coils. In the diagram, 5 5 indicate the main circuit of the dynamo-machine, and W $W^2$ electro-magnets placed upon or connected to said circuit in such way that they shall be affected by any change in the current strength. The magnets I $I^2$ are energized by current from the circuit 5 5, but might be energized from any other source. They are normally shunted from the circuit 5 5 through switch-contacts controlled by electro-magnets W $W^2$, the shunting-switch contacts of $W^2$ being arranged so as to close the circuit, while the influence of the retractor for the magnet prevails over the magnet, and the contacts for W being arranged to shunt the magnet I under reverse conditions—that is while the magnet W prevails over its retractor. The magnets, switches, and retractors are of any desired or ordinary description, those shown being merely typical of such devices, and consisting of solenoids whose movable cores are connected to contact-levers. Spiral springs applied to said levers constitute the retractors, and the usual adjustable contact-stops are applied and arranged as shown, the contact-stop for $W^2$ being applied so that the circuit will be closed on the back-stroke, and the contact-stop for W on the front stroke of the levers. Artificial resistances V V are arranged in shunts or branches around the magnets I $I^2$ and the switch-contacts, as shown, and serve to prevent undue sparking at the switching-contacts. They also serve to determine the amount of current that shall flow through magnets I $I^2$ when the shunts around said magnets are opened. The magnets I $I^2$ are wound with coarse wire, and the resistances V V may be approximately of the same resistance as the coils of the magnets, or greater. The retractors of the magnets W $W^2$ are so adjusted that when a current of normal strength is flowing on the circuit 5 5 the magnet $W^2$ shall be ineffective to break the shunt around $I^2$ and the retractor for W shall be ineffective to overcome the power of the magnet W under the action of such normal current. The adjustments are such as to give a margin for small fluctuations of current without disturbance of the switch-levers.

The action of the apparatus would be as follows: While the dynamo is running and the current is of normal strength, the magnets I $I^2$ are not energized, and the friction-clutch G is held by the springs $h^4$, Fig. 3, on an intermediate position between the wheels F $F^2$, which are meanwhile revolving in opposite directions and loosely on the counter-shaft, by the connection of the belts $B^3$ $B^4$ to the shaft B. The counter-shaft D, therefore, remains at rest, as also the shaft L, so that the shunting-switch worked thereby retains its position at the top of the switch-board M, Fig. 5, at which position it will be assumed to stand for the purposes of this description. The field-magnets A, therefore, retain their maximum power, all the section of field-coil being in circuit and active. If the current on the main circuit 5 5 increase for any reason beyond a determinate amount, governed by the set of the retractor for magnet $W^2$, the said magnet will draw down the lever connected to its core, thus breaking the shunt around the magnet $I^2$, thus permitting the current to flow through the latter. The core is thus moved, as before explained, so as to throw the friction-disk G against revolving disk F², thus causing the counter-shaft to move with said disk F² and to revolve the shaft L. The nut R is thereby moved downward, carrying the cross-bar and its sustained switching-contact $p^2$, so as to shunt first coil 1 of the field-magnet and then successively and in addition coils 2 3, &c., until the field-magnetism is so weakened that current on the circuit 5 5 is of normal amount. As soon as this is effected, the retractor for magnet W² again prevails, and the lever acted upon by said magnet is again drawn back so as to shunt the current from magnet I². The springs $h^4 h^4$ thereupon immediately center the lever H, withdrawing the clutch G from connection with the disk F², and bringing the nut R² and shunting-switch for the field-magnet to rest. In this position the parts remain until another change in the line-current may call for a further adjustment up or down. If the current again increase, the switch is moved farther downward, so as to shunt additional coils of the field-magnet, in the manner just explained. If the current decrease below the normal and adjusted degree, the retractor for magnet W prevails over the magnet, thus breaking the shunt for magnet I, which thereupon moves the bar K in the opposite direction to that just described, so as to bring the clutch-disk G against wheel F, with the effect of turning the counter-shaft in the opposite direction, and moving the shunting-switch for the field-magnets in the direction to successively remove the shunts around the sections of coils. The strength of the field-magnet is thus gradually increased until the current on the main circuit resumes its normal strength, whereupon the magnet W restores the shunt around magnet I, and the parts resume their normal position.

It is obvious that the switch-board M and its operating devices might be used for cutting in and out resistances in well-known manner—as, for instance, in the manner described in patent of C. F. Brush, No. 224,511—so as to shunt current in variable degree from the field-magnet or to other switching operations, the usefulness of the mechanism not being limited solely to the arrangement in which coils upon the field-magnet are shunted or cut out for the purpose of adjusting or determining the action of the machine.

In place of two magnets W W², acting as shown in Fig. 11, the arrangement of devices shown in Fig. 12 may be employed. In this figure, W⁴ indicates an electro-magnet in or connected to the circuit 5 5, so as to be affected by changes of current on said circuit. To its movable core or armature is connected a bar, $t^7$, bearing upon lever $a^5$ in direction to remove the same from its contact-stop when the power of the magnet increases to a predetermined extent, and bearing upon lever $a^6$ to remove the latter from its contact-stop when the power of the magnet decreases to such extent that it is no longer able to overcome the retracting-spring S⁵, acting on the movable core. The levers $a^5$ and $a^6$ respectively close shunts normally around the controlling magnets I I². The retractor S⁵ is set so that with a normal strength of current it shall approximately balance the pull of the magnet, plus the weight of the core and other parts sustained by it, and the levers $a^5 a^6$ are then held against their contact-stops by the springs or other influence. If the strength of the current increase sufficiently to overcome the influence of the retractor for $a^5$, the shunt of magnet I² is broken and an adjustment as before described is effected. If the strength of the current decrease sufficiently to permit the retractor S⁵ to remove the lever $a^6$ from its stop against the influence of the retractor for $a^6$, the shunt of magnet I is broken, thus permitting the latter to be energized.

What I claim as my invention is—

1. The combination, with a dynamo electric machine, of current-adjusting devices operated by mechanical power from the dynamo-machine shaft or a shaft rotating therewith, a mechanical reversing mechanism for controlling the movement of the adjusting devices under the action of said power, an actuating magnet or magnets for operating said reversing mechanism, and two switches controlling the flow of current to said magnets and governed by fluctuations of the current, one of said switches having a retractor adjusted above the strength of the normal current and the other a reversely-acting retractor adjusted below the tension of the normal current, as described, so that said switches may act separately upon an increase or a decrease of current, respectively.

2. The combination, with the adjusting mechanism for a dynamo-machine, of mechanical reversing devices, and two magnet-coils or sets of coils adapted to act in opposite directions upon a movable core or cores connected with the reversing mechanism, each of said coils having a portion of its core fixed and connected with a magnetic yoke-piece, as and for the purpose described.

3. The combination, with the yoke-piece E, made of iron, of the two sets of coils mounted thereon, movable cores K, fixed core-pieces for each coil bolted or secured to the common yoke-piece, and adjusting mechanism for the dynamo-machine governed by the movement of the movable cores K.

4. The combination, with the counter-shaft D, of the shaft L, having formed upon it a screw-thread, a nut carrying a cross-bar, and circuit-closing plates or springs borne by said cross-bar and bearing, respectively, upon the series of contact-studs, one series for each of the field-magnets whose strength is to be varied.

5. The combination, with the base M, of the series of contact-studs $p$, secured thereto, the shaft L, turning in suitable bearings at opposite ends of the base-plate, nut R, movable longitudinally on the shaft, and spring-contact carried by the latter and bearing on the studs.

6. The combination of the shaft L, nut R, cross-bar $R^3$, contact-pieces $p^2$, and spiral springs $r^4$, as and for the purpose described.

7. The cross-bar $R^3$, carrying insulating-bushings $r^2$, through which pass bolts or rods surrounded at their inner portion with spiral springs, as and for the purpose described.

8. In a dynamo-electric machine, the combination, with field-magnet coils divided into sections, of connections from the coil-sections alternately at opposite sides of the center section to the contacts of a shunting-switch, whereby the sections may be shunted, as described, alternately to each side of the center, as and for the purpose described.

9. In a dynamo-electric machine, the combination, with a field-magnet divided into sections, of a line of shunting contact studs or plates, and a connection from the individual contacts in order to the terminals of the coil-sections farthest from the center, the connection being made in alternate progression from the central coil to coils on opposite sides thereof, as described, whereby a contact moving over said studs and bridging adjoining studs in succession may effect a short-circuiting of the coil-sections in the order described.

10. The combination, with a dynamo-electric machine, of a switch governing the charge of the field-magnets and operated by mechanical connection with the dynamo-shaft or a shaft rotating therewith, an interposed reversing mechanism consisting, essentially, of two constantly-revolving disks upon a counter-shaft, an interposed clutch disk fixed to the counter-shaft, and two controlling-switches for determining the set of said reversing mechanism, said switches being adjusted to close or break circuit reversely, as the case may be, and being provided with retractors, adjusted one above and the other below the effects of a normal current.

Signed at New York, in the county of New York and State of New York, this 27th day of January, A. D. 1885.

BENJAMIN F. ORTON.

Witnesses:
   THOS. TOOMEY,
   GEO. C. COFFIN.